Oct. 1, 1963 L. N. LEA 3,105,690

SELECTIVE PHONOGRAPH APPARATUS

Filed Feb. 7, 1962

INVENTOR,
LAWRENCE N. LEA,

BY [signature]

ATTORNEY

United States Patent Office 3,105,690

Patented Oct. 1, 1963

3,105,690
SELECTIVE PHONOGRAPH APPARATUS

Lawrence N. Lea, 1683 University Ave., New York, N.Y.

Filed Feb. 7, 1962, Ser. No. 171,652
15 Claims. (Cl. 274—9)

The present invention relates to phonograph apparatus driven by an electric motor and contemplates the use of a revolving record which has successive lanes of sound track whose subject matter musically and/or intellectually, may all be of one topic or on different topics respectively.

An object of this invention is to provide a novel and improved electrically-driven and electrically-controlled phonograph apparatus of the character mentioned, which is adapted to play one lane at a time and stop at the end of each lane, for it requires that an element be moved to commence the playing of each lane respectively. When so done, that lane which is next to the stylus towards the end of the record, is the one which will be played.

Another object of this invention is to provide a novel and improved phonograph apparatus of the kind described, provided with means whereby when a particular button is pushed at the end of play of any lane, the pick-up arm is automatically lifted off the record and moved to the start of the record.

A further object thereof is to provide a novel and improved phonograph apparatus of the type set forth, in which any lane already played, can be selected and replayed. Then, if desired, succeeding lanes next to the very last lane played, can be played one at a time.

Another object is to have a selector means to choose the lane to be played, which may be any lane on the record. Then, if desired, succeeding lanes, next to the very last lane played, can be played one at a time.

A further object of this invention is to provide a novel and improved switching means for controlling motor operation to accomplish the necessary stops in relation to the ends of the record lanes and the respective starts and continued operation thereafter.

Another object is to have such phonograph apparatus allow the selection of the starting and stopping points of play so that any number of successive lanes can be played with a single setting of the control switching means.

Still another object of this invention is to provide an electrically-driven phonograph apparatus of the character described, having the mentioned attributes, which is simple in construction, easy to understand, simple to manipulate and efficient and positive in carrying out the purposes and functions for which it is designed.

Other objects and advantages will become apparent as this disclosure proceeds.

For the practice of this invention, one form it may assume is to have an electric motor arranged to rotate a record having successive sound lanes as heretofore mentioned. A pick-up arm is pivotally mounted so that its associated stylus can traverse the record; such arm being resilient so that the stylus bears with sufficient pressure against the record in a sound groove and said arm can be flexed so that the stylus is off the record. Said pick-up arm has a laterally extending finger adapted for wiping connection with one of a series of contact elements which are equi-spaced on the face of a rotatably mounted disc, extend radially thereon and successive contact elements are of greater length respectively when considered in one direction around said disc. The shortest of said contact elements allows wiping contact of said finger thereon, sufficient to play only the first lane of the record, for at the end of said first lane, said finger will be out of contact with said first contact element and thus the motor circuit will then be opened and the motor will stop. The second contact element is of sufficient length to allow the playing of the first and second record lanes. The third contact element is of sufficient length to allow the playing of the first three record lanes, and so on. All of said contact elements are connected by a perimetral ring on said disc. Such disc is of di-electric material while said contact segments and ring are conductive and the pick-up arm is also conductive as well as the phonograph frame. Said ring and segments are of course insulated from frame. There is a fixed brush in contact with said ring. The switch constituting said brush and finger, is in series with a manually operated switch in the motor circuit.

An adjustable stop means is provided to determine the extent the pick-up arm may be shifted towards the start of the record and hence serve to locate the pick-up arm at the commencement of any lane. This stop means is the selector and is associated with cam means to lift the pick-up arm off the record so as not to mar it, thus permitting the setting so that any lane can be chosen for play. Also, there is a manually-operated transporter to bring the pick-up arm against said stop means.

In the accompanying drawing forming part of this specification, similar characters of reference indicate corresponding parts in all the views.

Figure 2:
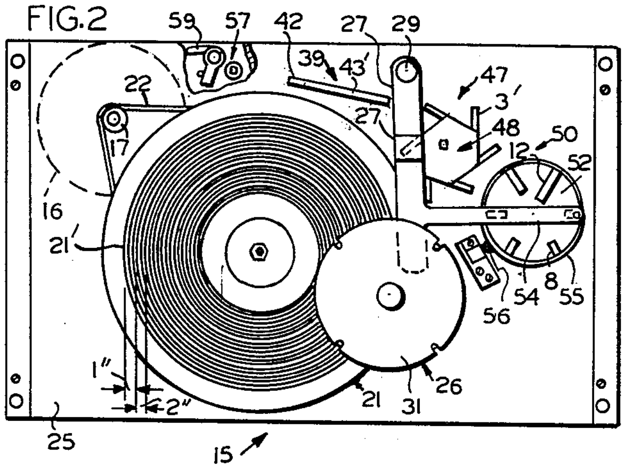
FIG. 2 is a top plan view thereof with part broken away to expose the manually-operated switch.

In the drawing, the numeral 15 designates generally a preferred embodiment of phonograph apparatus including an electric motor 16 whose shaft is fitted with a comparatively small pulley 17. A shaft 18, journalled on the frame denoted generally by the numeral 19, carries a comparatively large pulley 20 which supports the record indicated generally by the numeral 21. An endless belt 22 connects said pulleys which are in proper ratio to give the shaft 18 the proper speed at which said record shall rotate. The record is preferably held fast on the pulley 20, which as here shown, is by the nut 23 on the threaded end 24 of said shaft 18. The frame 19 is a tubular structure made of sheet metal or other suitable sheeting. Its front panel is denoted by the numeral 25 and its rear panel by 25'.

The pick-up arm designated generally by the numeral 26, comprises a thin springy strip 27 pivotally mounted on the frame at 29 at one of its ends and at its other end, said strip is welded or otherwise suitably secured to a metal cup 30 having a diaphragm 31 from which extends a stylus 32. The diaphragm is held as a cover for said cup 30 by means of the bent tabs 34 which extend upwardly from the rim of said cup. The stylus 32 extends through the cup, through a hole 33 in the cups' bottom and thence with its point into a sound groove on the record 21. The stylus is of course fixed to said diaphragm 31 and such assembly serves when the record is rotating, to translate the resulting vibrations of the stylus as determined by the sound groove 21', into sound, which is well known.

To shift the pick-up arm 26 back to the start of the record 21, or to the start of any lane already played, there is the reset or transporter means which is generally denoted by the numeral 39. This comprises the spring-loaded button 40 to which by a loose connection at 41, there is pivoted the end of a blade member 42, which serves to lift the pick-up arm 26 off the record 21 and reset it at a position at or towards the beginning of the record. Said reset member 42 has a notch 43 whose edge 43' contacts the underside of the springy element 27 to lift the pick-up arm 26 off the record 21 when said button 40 is pushed, while the inclined edge 44 acts as a cam against the end edge 45 of the slot 46 in the frame panel 25, to shift the pick-up arm. Said reset member 42 extends through said slot in which it is slidable.

To select which record lane is to be played, I provide the selector mechanism indicated generally by the numeral 47 which is really a means to stop the pick-up arm 26 when it is shifted towards the beginning of the record 21 by the reset member 42, to be at the start of the lane chosen, which is the case when the chosen lane is between the stylus 32 and the start of the record, or, such selector means is called upon to shift the pick-up arm to the start of a lane which is between the stylus and the end of the record. In the first instance, the reset member 42 lifts the pick-up arm and shifts it to position. In the latter instance, I provide that in setting the selector member 48, it should lift the pick-up arm 26 off the record while it is being moved across the record to the chosen lane's starting point, as will be explained.

Said selector mechanism 47 comprises a polygonal block which is the selector member 48 on the rotatably mounted shaft 49. When said shaft is turned, successive faces of said block are presented in the path of the springy element 27. The respective distances from the axis of said shaft 49 to said faces are such that when said element 27 is against and along a face, the stylus 32 will be positioned at a start of a particular record lane and hence there are at least as many faces on said block 48 as there are lanes on the record. Said block has a pin extending from each face thereof as at 5', which pin, geometrically speaking, is tangent to the plane of that face which is next to the face the pin extends from, whereby successive pins are in divergent relation. The block surfaces are indicated at 1—6 and said associated pins at 1'—6' respectively.

The electrical switch means designated generally by the numeral 50, includes a journalled shaft 51 carrying a disc 52 of insulative material which has equi-spaced contact elements on its face, indicated by the numerals 7—12, to be transversed by the brush 53 on the finger 54 which extends laterally as an integral part of the springy element 27. Said contact elements are conductive and a perimetral ring 55 of conductive material, connects all of said contact elements, and in turn is contacted by a fixed brush 56 which is insulated from frame. The springy element 27 being conductive through the frame 19, its finger 54 is conductive through frame.

Figure 4:
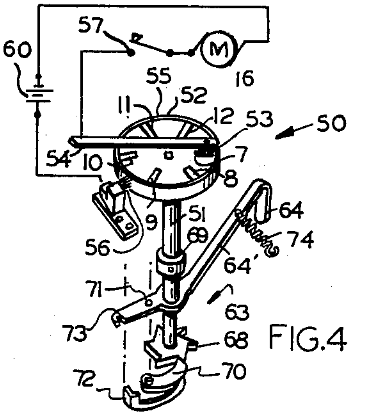
FIG. 4 is a perspective view of the switching mechanism which includes the rotatably mounted disc and a means is shown for turning same equal amounts so that a different contact element on said disc shall be presented for the control of motor operation. Also shown in this view is wiring diagram of the motor circuit.
Figure 1:
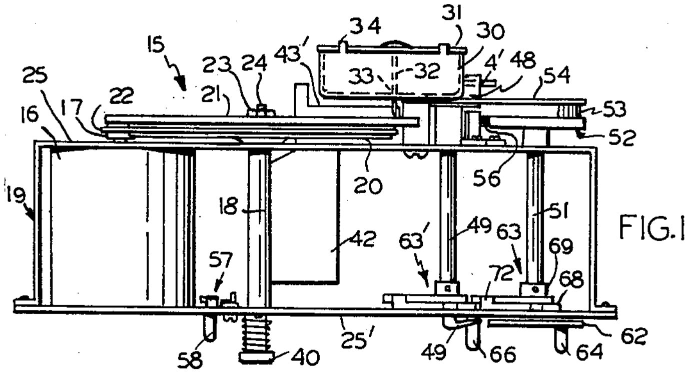
FIG. 1 is an elevational view of a phonograph apparatus embodying the teachings of this invention.
Figure 5:
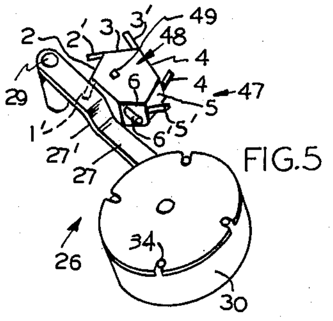
FIG. 5 is a fragmentary perspective view of the pick-up arm, commonly called the tone arm, associated with the selector means.

The motor circuit shown diagrammatically in FIG. 4, includes a manually-operated switch 57 whose operating member terminates in a finger piece 58 extending through the slot 59 in the back frame panel 25'. As for the current supply, when the apparatus is of small size, the motor 16 may be powered by dry cells 60 which may be housed within the casing 19, in front of the shaft 18 in FIG. 1; there being sufficient space to hold them between the side ends of the casing. When the pick-up arm's finger 54 contacts one of the conductive segments 7—12, the switch 50 is in closed condition. The switches 57 and 50 being in series in the motor circuit, it is evident that the motor will run while both said switches are closed, and will stop when either of said switches are opened. Said contact segments 7—12 are radially on the disc 52, and only that one which occupies the position the segment 7 is in, in FIG. 2 or 4, will be swept by the brush 53. As soon as said brush leaves the segment it is on, switch 50 will be in open condition and the motor circuit is open, whereupon the motor 16 will stop and playing will stop.

The length of the contact segment 7 is such that the brush 53 will remain in contact with it just enough to play the first lane 1" of the record 21. The length of the contact segment 8 is such that the brush 53 will remain in contact with it just enough to play the first lane 1" and also the second lane 2". The length of the contact segment 9 is such that the brush 53 will remain in contact with it just enough to play the first three lanes in succession and so on; the record having six lanes, the length of the contact segment 12 is such that the brush 53 will remain in contact with it sufficiently to play the entire record 21. It is evident that the contact segment wiped by the brush 53 need be at the position occupied by the segment 7 in FIGS. 2 and 4, as aforementioned; said brush moving along the contact segment it contacts, towards the center of the disc 52, as the stylus 32 transverses the record 21. Said position is determined by the arrow 61 on the rear face of the casing in conjunction with the numbers on the disc 62 which is fast on the shaft 51. When the numeral 1 on said disc 62 is at the arrow 61, the contact segment 7 is in the position illustrated in FIGS. 2 and 4. When the numeral 2 on said disc 62 is at the arrow, the contact segment 8 is at such position to be wiped by the brush 53 and so on.

Since all settings should preferably be made at the rear face of the casing 19, some means should be provided to separately turn the shafts 49 and 51. Although knobs (not shown) may be associated with each of said shafts for manual manipulation to turn them, I prefer a ratchet and driving pawl means as shown at 63, where the components thereof are shown apart, one such driving means for each of said shafts 49 and 51, to attain true location for the selector member 48 and the disc 52. The operating lever 64' of the mechanism 63 used for the shaft 51, has a bent finger-piece 64 extending through the slot 65. The operating lever of similar mechanism used for the shaft 49, has a bent finger piece 66 extending through the slot 67.

I will now describe the assembly of the mechanism 63 whose components are shown separated in FIG. 4. The shaft carries fast on it, a ratchet gear 68 having six teeth. The operating lever 64' is atop said gear, but loose on said shaft and held in place by a collar 69 secured on said shaft. A pawl 70 engaging said gear 68, is pivotally mounted at 71 on said lever 64' and there is a cantilever blade spring 72 secured at 73 to the lever 64', biasing the pawl 70 against the gear 68. Also, a spring 74 biases the lever 64' to be ready for the next shift of the gear. The said mechanism 63, as mentioned, is duplicated on the shaft 49, where it is denoted by the numeral 63'. Said shaft 49 carries at the back of the casing 19, a pointer 75 to indicate at a numeral around it, the position of the selector 48; of such numerals, number 1 denotes when the face 1 is in position to act as a stop for the springy element 27. When the numeral 2 is at said pointer 75, the selector 48 is in position to locate the pick-up arm 26 at the commencement of the second lane on the record, and so on.

The apparatus 15 as shown in the drawing, is in condition to be made to play the first lane indicated at 1" which is the outermost lane of the record 21, because the springy piece 27 is in contact with and along the face 1 of the block 48 and hence the stylus 32 engages the record at the commencement of said lane. The brush 53 is in contact with the outermost region of the contact segment 7. The switch 57 is in open condition. The motor 16 is at rest.

Figure 3:
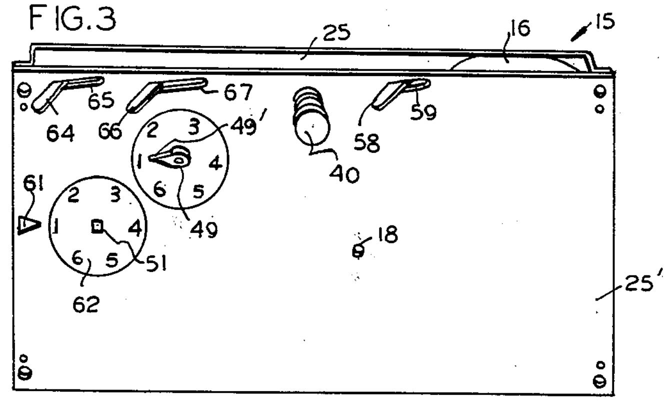
FIG. 3 is a bottom view of FIG. 1, shown in perspective.
Figure 6:
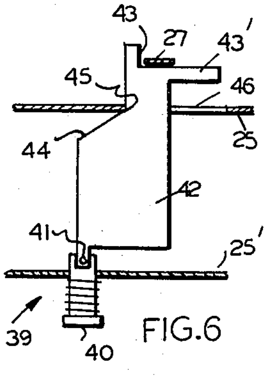
FIG. 6 is a fragmentary view in elevation, showing the transporter means for resetting the pick-up arm to a start position.

To operate, close the switch 57 by shifting the finger piece 58 to the right in FIG. 3, whereupon the motor circuit is closed and the motor 16 will run. As soon as the motor starts, the lane 1″ will be played and at the completion of such play, meaning when the stylus 32 reaches the end of said lane 1″, the brush 53 will be off the contact segment 7, and this will stop the motor because its circuit is now open. Now, to play the second lane 2″, shift the finger piece 64 to the right in FIG. 3. This turns the disc 52 so that the contact segment 8 is in contact with the brush 53. The motor circuit is thus closed, the lane 2″ is played and at the end thereof, said brush 53 will be off the contact segment 8. Hence the motor will stop. It is evident that each successive lane can be played if at the end of a play, the disc 52 is turned one division by operation in each instance of the finger piece 64. Also to be noted is that at any rest position, any number of next successive record lanes can be played without stop between lanes, if the disc 52 is properly set so that the contact segment in contact with the brush 53, offers sufficient length to accomplish the intended purpose. So first open switch 57, then note the reading of arrow 61 on the wheel 62. Advance wheel 62 by operating the finger piece 64 so that the reading at the arrow is in excess of the first read noted, by the number of next succeeding lanes to be played. Now close the switch 57. This presupposes that the selector block 48 has not been moved for the position shown, that is, the reading of the pointer 49′ is at the numeral 1 of the circle of numerals around it.

Should you press the button 40 at the end of play of any lane, without changing the position of the block 48, the pick-up arm 26 will be lifted by the reset member 42 and due to the cam action offered by the cooperation of the slanted edge 44 with the edge 45, the pick-up arm will be swung on the axis 29 until the springy strip element 27 contacts the face 1 of the block 48. Now, upon release of the button 40, the pick-up arm 26 moves towards the record 21 and the stylus 32 will again be in engagement with the start of the sound groove of the lane 1″, which is the start of the record.

If at the end of play of any lane, it is desired to replay a lane which was played, then you open the switch 57, and then turn the block 48 by operating of the finger piece 66, to position said block to present its appropriate stop face to be in position to intercept the springy piece 27. Then press the button 40, whereupon the pick-up arm 26 will be transported to the desired start position. Release hold of said button 40 and the apparatus is ready to play upon closing the switch 57. It is evident that at this point in the specification, that from any rest position of the stylus, which is of course when the motor 16 is at rest, the machine can be set to play any lane between said stylus and the start of the record, because the reset means can transport the pick-up arm only towards the start of the record.

From any rest position of the stylus 32, it can be brought to the commencement of any lane between the stylus and the end of the record, by positioning the block 48 to present its appropriate face to be in position against the spring piece 27. Of course, the turning of the block 48 will shift the pick-up arm 26 towards the end of the record, but I provide that during each interval that said block 48 is in movement to present its next face at the springy piece 27, that said piece shall be lifted whereupon the stylus 32 is moved off the record, which lifting off is accomplished successively by the pins of the series indicated by the numerals 1′—6′.

All means to be manipulated by the operator, are shown in FIG. 3. Here, to close the switch 57, the finger piece 58 is shifted to the right. To open said switch, this finger piece 58 is shifted to the left. To choose the lane to be played first, the finger piece 66 is shifted up and back until the arrow 49′ is at such number which indicates the lane chosen to be played first. To choose the number of consecutive lanes to be played, the finger piece 64 is shifted up and back until the arrow 61 is at such number which indicates the number of lanes to be played in succession. If the arrow 61 is at the position of numeral 1, then only that lane will be played which is indicated by the arrow 49′. While settings are being made, the switch 57 is set to be open. After the settings are made to get the required readings at the arrows 49′ and 61, the reset button 40 is pushed and released. The device 15 will operate now, upon the closing of said switch 57.

This invention is capable of numerous forms and various applications without departing from the essential features herein disclosed. It is therefore intended and desired that the embodiments described herein shall be deemed merely illustrative and not restrictive and that the patent shall cover all patentable novelty herein set forth; reference being had to the following claims rather than to the specific description herein to indicate the scope of this invention.

I claim:

1. In a phonograph apparatus, a frame, a phonograph record revolvably mounted on the frame, an electric motor with means arranged to turn said record when said motor is actuated, a pick-up arm comprising a springy strip element swingably mounted at one of its ends on the frame, for movement across the record and a means including a stylus associated with a diaphragm at the other end of said strip element, adapted when the record is turning and said stylus is in contact with a sound groove on the record, to translate vibrations of the stylus into sound; said strip element being biased so that said stylus normally contacts the record, an electrical switch mechanism including a dielectric member movably mounted on the frame, carrying a predetermined number of electrically conductive contact elements in spaced relation thereon, conductive means connecting said contact elements and constituting one terminal of said switch mechanism, an electrically conductive finger constituting the other terminal of said switch mechanism, extending from said strip element; said dielectric member being shiftable so that said finger is adapted to be in wiping contact with one of said contact elements at one time at any position the stylus may be on the record and as such pick-up arm moves to bring the stylus towards the end of the record, to traverse said one contact element; the wiping distances of said finger on the respective contact elements being of different predetermined magnitudes respectively, means on the frame to hold the dielectric member at any one selected of predetermined positions on the frame and a circuit for actuating said motor, including said switch mechanism to control motor operation.

2. A phonograph apparatus as defined in claim 1, including a second switch in series with the mentioned switch mechanism.

3. A phonograph apparatus as defined in claim 1, wherein said dielectric member is rotatably mounted on the frame; said contact elements being radially arranged thereon; finger movement being along the contact element it is in wiping relation with.

4. A phonograph apparatus as defined in claim 3, wherein the means connecting the contact elements is a ring from which they extend radially and a brush offering the terminal for such means, fixed on the frame and in wiping contact with said ring.

5. A phonograph apparatus as defined in claim 3, wherein the wiping distance of the finger on one contact element is for the duration of the playing of the record from start to finish and wherein the respective wiping distances of the finger on the other contact elements are less.

6. A phonograph apparatus as defined in claim 5, wherein the respective wiping distances of the finger on such other contact elements are progressively less.

7. A phonograph apparatus as defined in claim 1, wherein the wiping distance of the finger on one of the contact elements is for the duration of the playing of the record from start to finish and wherein the respective wiping distances of the finger on the other contact elements are less.

8. A phonograph apparatus as defined in claim 7, wherein the respective wiping distances of the finger on such other contact elements are progressively less.

9. A phonograph apparatus as defined in claim 1, including means on the frame to set and releasably hold the dielectric member at predetermined positions on the frame.

10. A phonograph apparatus as defined in claim 9, wherein at such positions, the finger will contact the start of a contact element when the stylus is at the start of the record.

11. A phonograph apparatus as defined in claim 1, including a stop element on the frame, positioned to be contacted by said springy strip element when the stylus is at the beginning of the record; said strip element moving away from said stop element as the stylus moves towards the end of the record and a means on the frame for moving said strip so that the stylus leaves the record and is shifted by said means against said stop element; said means being biased to a normal rest position where it would engage said spring strip element when the stylus is at the end of the record.

12. A phonograph apparatus as defined in claim 11, wherein said stop element is selectively positionable on the frame so that it will contact said springy element when the said springy element is shifted by the strip-moving means from the end of the record towards the beginning of the record to any of predetermined possitions where the stylus is at predetermined positions on the record respectively.

13. In a phonograph apparatus, a frame, a phonograph record revolvably mounted on the frame, an electric motor with means arranged to turn said record when said motor is actuated, a pick-up arm comprising a springy strip element swingably mounted at one of its ends on the frame, for movement across the record and a means including a stylus associated with a diaphragm at the other end of said strip element, adapted when the record is turning and said stylus is in contact with a sound groove on the record, to translate vibrations of the stylus into sound; said strip element being biased so that said stylus normally contacts the record, an electrical switch mechanism including a dielectric member movably mounted on the frame, carrying a predetermined number of electrically conductive contact elements in spaced relation thereon, conductive means connecting said contact elements and constituting one terminal of said switch mechanism, an electrically conductive finger constituting the other terminal of said switch mechanism, extending from said strip element; said dielectric member being shiftable so that said finger is adapted to be in wiping contact with one of said contact elements at one time at predetermined positions of the stylus on the record respectively and as such that the pick-up arm moves to bring the stylus towards the end of the record, to traverse said one contact element, means on the frame to hold the dielectric member at any one selected of predetermined positions on the frame and a circuit for actuating said motor, including said switch mechanism to control motor operation.

14. A phonograph apparatus as defined in claim 13, including a second switch in series with the mentioned switch mechanism.

15. A phonograph apparatus as defined in claim 13, including a stop element on the frame, positioned to be contacted by said springy strip element when the stylus is at the beginning of the record; said strip element moving away from said stop element as the stylus moves towards the end of the record and a means on the frame for moving said strip so that the stylus leaves the record and is shifted by said means against said stop element; said means being biased to a normal rest position where it would engage said spring strip element when the stylus is at the end of the record; said stop element being selectively positionable on the frame so that it will contact said springy element when said springy element is shifted by the strip-moving means from the end of the record towards the beginning of the record to any of predetermined positions wherein the stylus is at predetermined positions on the record respectively.

References Cited in the file of this patent

UNITED STATES PATENTS

| | | |
|---|---|---|
| 2,076,937 | Cannon | Apr. 13, 1937 |
| 2,953,383 | Walters | Sept. 20, 1960 |